(12) United States Patent
Bachorz et al.

(10) Patent No.: US 12,230,460 B2
(45) Date of Patent: Feb. 18, 2025

(54) ELECTRIC SWITCHING DEVICE

(71) Applicant: HITACHI ENERGY LTD, Zürich (CH)

(72) Inventors: Lukasz Bachorz, Mount Martha (AU); Timothy Heemskerk, Mooroolbark (AU); Jonathan Lam, Northcote (AU)

(73) Assignee: HITACHI ENERGY LTD, Zurich (CH)

( * ) Notice: Subject to any disclaimer, the term of this patent is extended or adjusted under 35 U.S.C. 154(b) by 93 days.

(21) Appl. No.: 17/915,564

(22) PCT Filed: Apr. 3, 2020

(86) PCT No.: PCT/EP2020/059602
§ 371 (c)(1),
(2) Date: Sep. 29, 2022

(87) PCT Pub. No.: WO2021/197619
PCT Pub. Date: Oct. 7, 2021

(65) Prior Publication Data
US 2023/0109760 A1 Apr. 13, 2023

(51) Int. Cl.
*H01H 33/02* (2006.01)
*H01H 33/59* (2006.01)

(52) U.S. Cl.
CPC ........ *H01H 33/027* (2013.01); *H01H 33/593* (2013.01)

(58) Field of Classification Search
CPC ............... H01H 33/027; H01H 33/593; H01H 2033/028; H01H 9/16; H01H 9/56;
(Continued)

(56) References Cited

U.S. PATENT DOCUMENTS 6,172,863 B1 1/2001 Ito et al.
7,786,710 B2 * 8/2010 Drugge ................. H02J 3/1828
323/210

(Continued)

FOREIGN PATENT DOCUMENTS

DE 202017103766 U1 7/2017
EP 2827353 A1 1/2015
(Continued)

OTHER PUBLICATIONS

International Search Report and Written Opinion of the International Searching Authority, PCT/EP2020/059602, mailed Dec. 10, 2020, 17 pages.

*Primary Examiner* — William A Bolton
(74) *Attorney, Agent, or Firm* — Sage Patent Group

(57) ABSTRACT

An electric device comprises a first and second voltage sensor, a current sensor, an actuator and a controller. The first voltage sensor senses a first voltage at a first contact of a switch inside the electric device and generates a first voltage signal indicating the first voltage, the first contact of the switch coupled to a source line. The second voltage sensor senses a second voltage at a second contact of the switch and generates a second voltage signal indicating the second voltage, the second contact is coupled to a reactive component. The current sensor senses a current at the second contact of the switch and generates an output signal indicating the current. The controller is coupled to the voltage sensors, the current sensor and the actuator and causes, based on at least one of the voltage and current signals, the actuator to actuate one of the contacts to execute switching at a predetermined point of the first voltage.

19 Claims, 6 Drawing Sheets

(58) Field of Classification Search
CPC . H01H 9/563; H01H 2009/566; H02J 3/1828; G01R 31/3275
USPC .......... 218/118, 119, 121, 143–146
See application file for complete search history.

(56) References Cited

U.S. PATENT DOCUMENTS

| | | | |
|---|---|---|---|
| 9,267,992 B2* | 2/2016 | Shiraishi | G01R 31/3275 |
| 9,959,999 B2* | 5/2018 | Adachi | H01H 33/36 |
| 10,424,451 B2 | 9/2019 | Lenig et al. | |
| 10,490,366 B2* | 11/2019 | Mori | H01H 33/59 |
| 2004/0015501 A1 | 8/2004 | Schreiber et al. | |
| 2010/0170774 A1* | 7/2010 | Einschenk | H01H 33/027 |
| | | | 200/48 R |
| 2017/0294786 A1* | 10/2017 | Gerovac | H02J 7/0068 |
| 2019/0123549 A1* | 4/2019 | Rodrigues | G06F 1/28 |
| 2019/0181851 A1* | 6/2019 | Landes | H01H 3/54 |

FOREIGN PATENT DOCUMENTS

| | | |
|---|---|---|
| JP | 2016219217 A | 12/2016 |
| WO | 2008/151937 A1 | 12/2008 |
| WO | 2013/066332 A2 | 5/2013 |
| WO | 2018001798 A1 | 1/2018 |
| WO | 2018/136828 A1 | 7/2018 |

* cited by examiner

ELECTRIC SWITCHING DEVICE

CROSS REFERENCE TO RELATED APPLICATIONS

This application is a 35 U.S.C. § 371 national stage application of PCT International Application No. PCT/EP2020/059602 filed on Apr. 3, 2020, the disclosure and content of which is incorporated by reference herein in their entirety.

TECHNICAL FIELD

Example embodiments of the present disclosure generally relate to a technology of an electric device and more particularly, to an electric switching device and its manufacturing method.

BACKGROUND

Electric switching devices are widely employed in electric networks. In medium voltage capacitor bank systems, vacuum switches, which typically contain a vacuum interrupter (VI) device, are the commonly used switch due to their superb dielectric and arc quenching capabilities. Other advantages of vacuum switches include lower cost, smaller footprint and maintenance free operations.

For electric switching devices, it is important to minimize switching transients during switching, as a large transient may cause a failure of the electric switching device and/or other electrical system components, resulting in catastrophic failure in severe cases. Conventionally, to minimize the switching transients, one approach is to increase system impedance. However, this incurs power losses and increases cost due to the introduction of additional components, such as resistors.

Another approach is to provide a controlled switching package independent of the switch to control the switching. This approach is very costly due to the system complexity and the requirement for additional components, such as external instruments and transformers. In addition, this type of controlled switching package provides only controlled closing option. Thus, an improved approach for controlled switching to reduce transients, and the negative effect of transients is desired.

SUMMARY

Example embodiments of the present disclosure propose a solution of smart electric device switching to reduce transients.

In a first aspect, an electric device is provided. The electric device comprises a first voltage sensor, a second voltage sensor, a current sensor, an actuator and a controller. The first voltage sensor is configured to sense a first voltage at a first contact of a switch inside the electric device and to generate a first voltage signal indicating the first voltage, the first contact of the switch coupled to a source line. The second voltage sensor configured to sense a second voltage at a second contact of the switch and to generate a second voltage signal indicating the second voltage. The second contact of the switch is coupled to a reactive component. The current sensor is configured to sense a current at the second contact of the switch and to generate a current or voltage output signal indicating the current. The controller is coupled to the first and second voltage sensors, the current sensor and the actuator. The controller is configured to cause, based on at least one of the first and second voltage signals and the current signal, the actuator to actuate one of the first and second contacts to execute switching at a predetermined point of the first voltage.

In a second aspect, an electric system is provided. The electric system comprises a plurality of branches. Each branch comprises a reactive component and an electric device of the first aspect coupled to the reactive component.

In a third aspect, a method for manufacturing an electric device is provided. The method comprises providing a first voltage sensor, providing a second voltage sensor, providing a current sensor, providing an actuator and providing a controller. The first voltage sensor is configured to sense a first voltage at a first contact of a switch inside the electric device and to generate a first voltage signal indicating the first voltage, the first contact of the switch coupled to a source line. The second voltage sensor is configured to sense a second voltage at a second contact of the switch and to generate a second voltage signal indicating the second voltage. The second contact of the switch is coupled to a reactive component. The current sensor is configured to sense a current at the second contact of the switch and to generate a current or voltage output signal indicating the current. The controller is coupled to the first and second voltage sensors, the current sensor and the actuator. The controller is configured to cause, based on at least one of the first and second voltage signals and the current signal, the actuator to actuate one of the first and second contacts to execute switching at a predetermined point of the first voltage.

According to the embodiments of the present disclosure, the solution according to embodiments of the present disclosure is to achieve switching at a desired point of wave of the voltage to reduce transients. In addition, the embodiments of the present disclosure may include the device's temperature monitoring system which can accurately determine the temperature with high operational reliability and long-term stability.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

Figure 1:
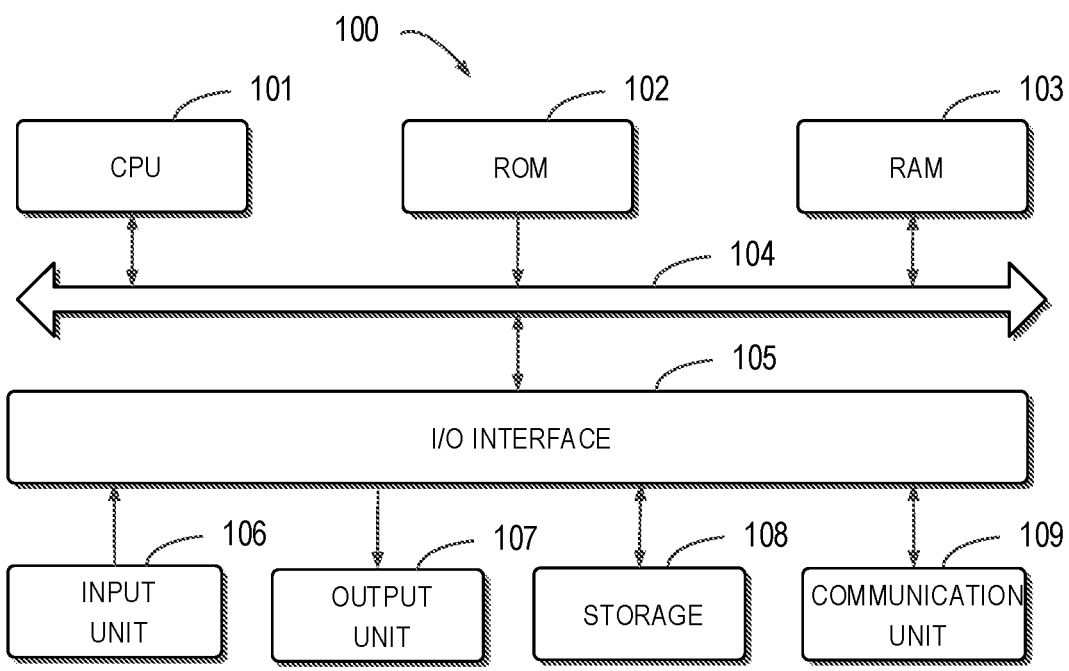
FIG. 1 illustrates an example device of implementing some example embodiments of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

FIG. 1 illustrates a schematic diagram of an electronic device 100 for implementing embodiments of the present disclosure. As shown, the electronic device 100 includes a central process unit (CPU) 101 in an embodiment. In another embodiment, one or more processors apply as well.

The CPU 101 can perform various suitable acts and processing based on the computer program instructions stored in the read-only memory (ROM) 102 or the computer program instructions loaded into the random-access memory (RAM) 103 from the storage unit 108.

Various kinds of programs and data required by the operations of the device 100 can also be stored in the RAM 103. CPU 101, ROM 102 and RAM 103 are connected to each other via a bus 104. The input/output (I/O) interface 105 is also connected to the bus 104.

A plurality of components in the device 100 are connected to the I/O interface 105, including: an input unit 106, such as a keyboard, a mouse and the like; an output unit 107, such as various kinds of displays and loudspeakers and the like; a storage unit 108, such as a disk and an optical disk and the like; and a communication unit 109, such as a network card, a modem, a wireless communication transceiver and the like. The communication unit 109 allows the device 100 to exchange information/data with other devices via the computer network, such as the Internet, and/or various telecommunication networks.

Each procedure and process described below, such as the method 600 of FIG. 6 as described below, can also be performed by the processing unit 101. For example, in some embodiments, the method 600 can be implemented as a computer software program tangibly included in the computer-readable medium, for example the storage unit 108.

In some embodiments, the computer program can be partially or fully loaded and/or mounted to the device 100 via the ROM 102 and/or the communication unit 109. When the computer program is loaded to the RAM 103 and executed by the CPU 101, acts of the method 600, can be implemented.

Generally, various embodiments of the present disclosure can be implemented by hardware or dedicated circuit, software, logic, or any combinations thereof. Some aspects can be implemented by hardware while other aspects can be implemented by firmware or software, in which the firmware or the software can be executed by the controller, the microprocessor or other computing devices.

Although aspects of the present disclosure are illustrated and described as block diagram and flow chart or represented using some other graphs, it should be understood that the block, device, system, technology or method described herein can be implemented by hardware, software, firmware, dedicated circuit or logic, universal hardware, or controller or other computing devices, or any combinations thereof in a non-restrictive manner.

In an example, the storage unit 108 may store one or more programs configured to be executed by one or more processors, the one or more programs including instructions for performing the method 600, as described below.

As described above, it is important to minimize switching transients occurred during switching. Capacitor bank switching is a highly demanding operation which can cause high frequency transient inrush currents in an order of several kilo amperes during energization of empty capacitors, especially during back-to-back switching. In conventional approaches, it is proposed to incorporate impedance or an external control package to minimize the transients. However, the impedance may incur power loss, and the external package to minimize switching transients may significantly increase cost and size of the switch.

Additionally, during de-energization of the capacitor bank, a restrike may occur. In conventional approaches, the switch generally relies on its own dielectric withstand capability to avoid the restrikes, without controlling the switching-off instant on the waveform of the voltage. This may cause a failure of the switch in some cases.

Point on wave (PoW) or Zero Volt Closing (ZVC) switches have been widely adopted in higher voltage applications, however their cost has made them prohibitive at the distribution voltage level. Many PoW/ZVC solutions at distribution level have also been limited in their effectiveness given a lack of feedback into the control system which means they operate in an open-loop fashion. In these cases the accuracy of such solutions is compromised and the switch may close at any point on the voltage sine wave. In case that they switch at a non-zero voltage, transients may occur and may increase depending on the amplitude of the voltage.

However, even if the switches are designed to switch on at a zero voltage, the inventors find that the switches often do not switch on correctly at the instant of the zero voltage. The inventors further find that there is a delay between the instant that controller 26 issues a closing signal and the instant that contacts 22 and 24 are physically contacted with each other, and more importantly the delay may vary based on various reasons, including but not limited to temperature, service time of the switch 20 and so on. In this event, the inventors propose a novel solution to accurately control the switch.

Figure 2:
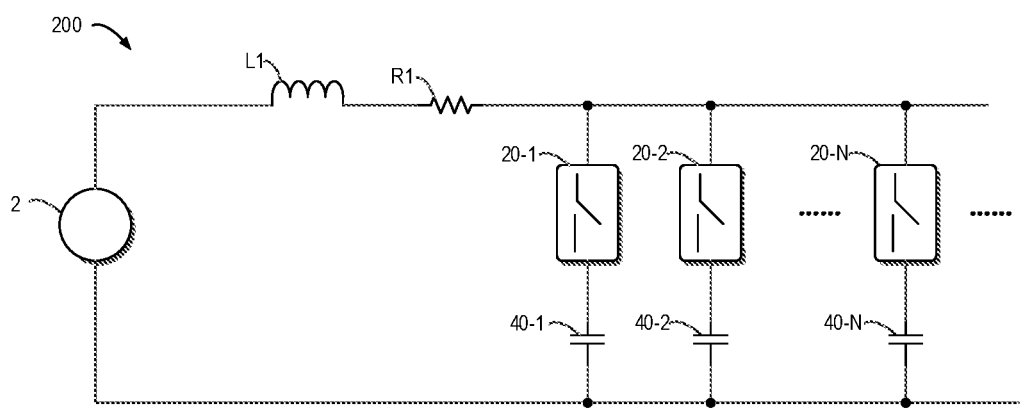
FIG. 2 illustrates an environment implementing an electric system in accordance with some example embodiments of the present disclosure.

FIG. 2 illustrates an environment implementing an electric system 200 in accordance with some example embodiments of the present disclosure. In an embodiment, the electric system 200 may comprise an AC source 2, a first inductor L1 and a first resistor R1. The electric system 200 may further comprise at least one electric device 20-1, 20-2, . . . , 20-N(collectively referred to as "electric device 20") and at least one reactive component 40-1, 40-2, . . . , 40-N (collectively referred to as "reactive component 40"), where N represents an integer greater than zero. Each of the at least one electric device 20-1, 20-2, . . . , 20-N is coupled in series with a corresponding one of the at least one reactive component 40-1, 40-2, . . . , 40-N between a source line and a system neutral point, a system ground line, or a subsequent phase source line. In some embodiments, the reactive component may be a capacitor, an inductor and so on.

The AC source 2 provides AC current flowing through the first inductor L1 and the first resistor R1 to the electric device 20 and the reactive component 40. In some embodiments, the electric device 20 may be a vacuum interrupter. The electric device 20 may operate to switch on or switch off the electric path based on a controlling signal. Although the electric device 20 is illustrated to be a vacuum interrupter, this is only for illustration without suggesting any limitations as to the scope of the subject matter described here. It is to be understood that the approach described herein may be applied to other electric devices containing a non-vacuum based interrupter device.

Figure 3:
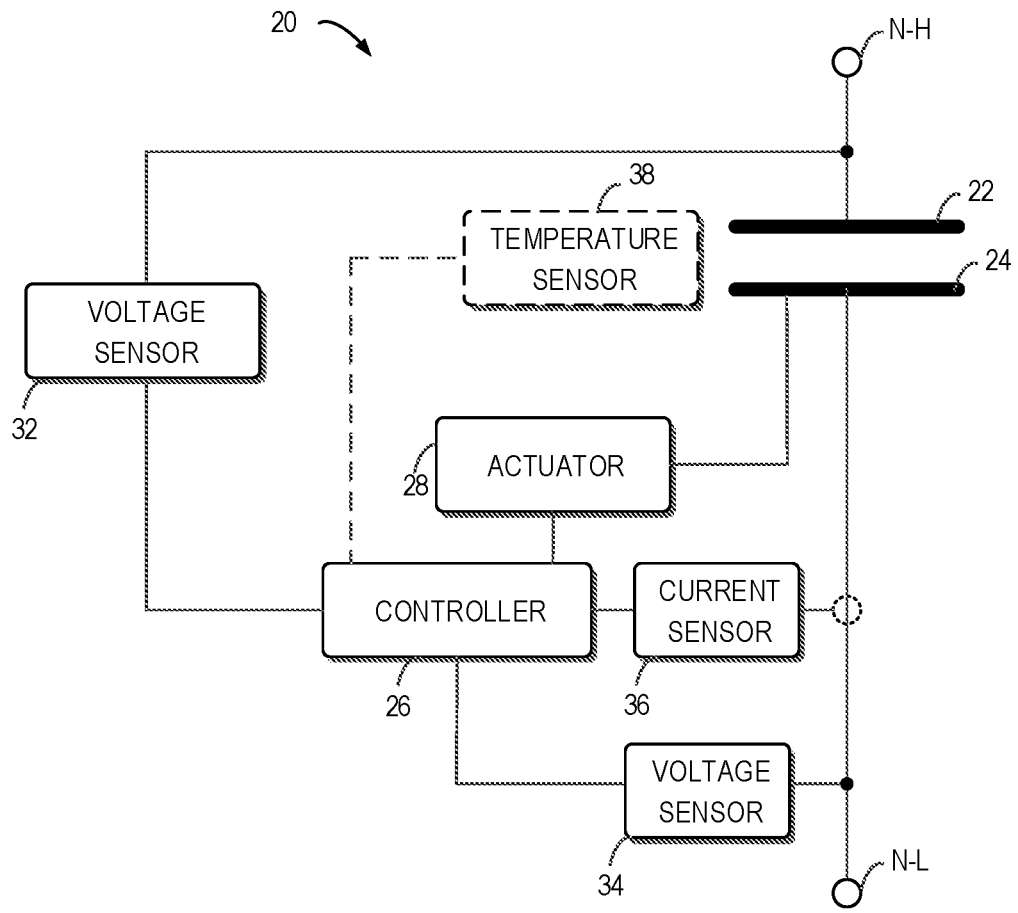
FIG. 3 is a block diagram illustrating an electric device in accordance with some example embodiments of the present disclosure.

FIG. 3 is a block diagram illustrating an electric device 20 in accordance with some example embodiments of the present disclosure. It is to be understood that all the components shown in FIG. 3 is located and sealed inside the electric device 20. This is benefit for some switches, such as vacuum interrupters. In an embodiment, the electric device 20 is a switch comprising a first contact 22 and a second contact 24. The first contact 22 is a fixed contact coupled to a first node N—H, and the second contact 24 is a movable contact coupled to a second node N-L. In an embodiment, the first node N—H is coupled to a source line, and the second node N-L is coupled to a first terminal of the reactive component 40.

The electric device 20 may further comprise a controller 26 and an actuator 28. The actuator 28 receives a moving signal from the controller 26 to cause the second contact 24 to move, such that the second contact 24 may physically contact the first contact 22 to switch on the electric path, or may physically depart from the first contact 22 to switch off the electric path. The controller 26 may switch on or switch off the electric path based on instructions received from an external controller or a remote controlling center, such as a controlling center of a grid.

The electric device 20 further comprises a voltage sensor 32 to sense a first voltage at the first contact 22 of the switch inside the electric device 20. The first contact 22 is coupled to a source line. The electric device 20 further comprises a second voltage sensor 34 to sense a second voltage at a second contact 24 of the switch. The second contact 34 is coupled to the reactive component 40. The controller 26 is configured to receive a first voltage signal indicating the first voltage from the voltage sensor 32 and a second voltage signal indicating the second voltage from the voltage sensor 34.

The electric device 20 may further comprise a current sensor 36 to sense a current at the second contact 24 of the switch. The controller 26 is further configured to receive a current or voltage output signal indicating the current. In an embodiment, all the three sensors and the controller 26 are located inside the electric device 20. In other embodiments, the controller 26 may be located outside the electric device 20, and can be implemented as the electronic device 100 of FIG. 1.

In some embodiments, the electric device 20 may further comprise a temperature sensor 38 to sense ambient temperature near the actuator 28. Although the voltage sensor 32, the voltage sensor 34, the temperature sensor 38 and the current sensor 36 are illustrated to be individual sensors, this is only for illustration without suggesting any limitations as to the scope of the subject matter described here. It is to be understood that a sensing unit integrating all the sensors applies as well. The sensors all are configured to continuously monitor the voltages, temperatures and currents, and send the sensed results to controller 26 immediately or periodically.

The controller 26 may determine the delay between transmitting a switching signal and a completion of the switching. In an embodiment, the controller 26 receives a first signal from the external controlling center randomly. The first signal indicates that the electric device 20 needs to be switched on. The controller 26 transmits, upon receiving the first signal, a first switching signal at a first temporal point or a first instant to the actuator 28 to cause the actuator 28 to move the second contact 24 towards the first contact 22.

The current sensor 36 continuously senses current flowing through the electric path between the node N—H and the node N-L. In case that the second contact 24 is physically connected with the first contact 22 at a second temporal point or a second instant, the electric path is established and the current starts to flow in the electric path. As such, the current signal indicates a current level turning from zero to above zero, and the controller 26 may thus determine the status of the switch 20 changing from an open status to a closed status. In case that the current level turning from above zero to zero, and the controller 26 may determine the status of the switch 20 changing from the closed status to the open status.

The controller 26 may compute the time delay based a time difference between the first temporal point and the second temporal point. In this manner, the controller 26 may synchronize with a zero voltage at the first contact 22. In an embodiment, the delay computation may be carried out as a test run before the electric device 20 normally operates in an electric system.

In another embodiment, the voltage signals sensed by the first and second voltage sensors 32 and 34 can be used to determine the instant that the first and second contacts 22 and 24 are physically connected with each other. In case the second contact 24 is physically connected with the first contact 22 at the second temporal point, the electric path is established and the current flows in the electric path. As such, the voltage at the first contact 22 and the voltage at the second contact 24 will be identical, and the controller 26 may thus determine the status of the switch 20 as the closed status. The controller 26 thus may determine the instant in response to the identical voltages at the first and second contacts 22 and 24.

The controller 26 may thus send the switching signal to the actuator 28 at a proper time in subsequent operation, in consideration of the computed time delay. For example, the time delay is one second. The controller 26 may transmit the switching signal one second in advance of the determined time of the incoming zero voltage, such that the first and second contacts 22 and 24 can physically connected with each other at the zero voltage one second later. The time for zero voltage may be determined based on continuous sensing the voltage of the first contact 22 and the voltage being a periodic voltage.

Moreover, the delay time may be dynamically calibrated. In an embodiment, the controller 26 may obtain a first delay for a first switching, which is different from the initial delay for the test run. The controller 26 may store the obtained delay in a storage device, such as the ROM 102. In the second switching subsequent to the first switching, the controller 26 may retrieve the delay for the first switching from the storage device and use it to send the switching signal in advance for the second switching based on the obtained delay. Meanwhile, the controller 26 may continue to determine the delay for the second switching in a similar manner and store it in the storage device for the switching next to the second switching. As such, the controller 26 may dynamically calibrate operation of the actuator based on the first and second voltage signals and the current signal.

Likewise, the controller 26 may receive a second signal randomly from the external controlling center. The second signal indicates that the switch 20 needs to be switched off. The controller 26 may send the second switching signal to the actuator 28 to cause the second contact 24 to separate from the first contact 22 at a temporal point of zero current, or a short time after the temporal point of the zero current in consideration of the arcing time. The arcing time may be pre-stored in the storage device.

In an embodiment, the controller 26 may use the signals from at least one of the current sensor 36 and the first and second voltage sensors 32 and 34 to determine the delay between the temporal point of sending the second switching signal and the temporal point of separation of the first and second contacts 22 and 24. The temporal point of separation may be determined based on no current or the voltages at the first and second contacts 22 and 24 being different. In an embodiment, the controller 26 may use the determined delay to switch off at any point of the wave of the voltage at the first contact 22.

As described above, the controller 26 may control the actuator 28 to achieve the switching at any point of the wave of the voltage at the first contact 22 with the signal from at least one of the first and second voltage sensors 32 and 34, and the current sensor 36. However, the above approach using previous delay time may not be accurate in some cases. The inventor finds that the delay may be affected by some factors including temperature, mechanical wear due to long service time and so on.

Specifically, the actuator 28 comprises a coil to actuates the second contact 24, and the resistance of the coil may vary at different temperatures. This would lead to different time lengths for a same actuation distance. In an embodiment, the controller 26 may determine the delay based on the temperature sensed by the temperature sensor 38. The controller 26 may retrieve an average delay at a reference temperature from the storage device, such as the ROM 102. The controller 26 may receive the temperature signal indicating a current temperature of the actuator 28 from the temperature sensor 38. The controller 26 may use a computation algorithm stored in the RAM 103 to compute the anticipated delay based on the average delay at the reference temperature and the current temperature, and controls the actuator 28 in consideration of the computed delay.

In another embodiment, the controller 26 may receive the temperature signal indicating a current temperature of the actuator 28 from the temperature sensor 38, and determine the anticipated delay by looking up the mapping table stored in the RAM 103 or ROM 102. The mapping table stores relationship between the temperatures and the delays.

Service time of the switch 20 may also affect the delay. The inventors find that general wear and changed friction of the moving parts can result in the operating time change.

To take this factor into consideration, the controller 26 may comprise a counter to count the number of switching operations performed by the switch 20. Alternatively, there is an independent counter to count the number of switching operations. The controller 26 is further configured to adjust the timing of its output signal, based on the counted number and at least one of the first and second voltage signals and the current signal, to the actuator 28 to operate one of the first and second contacts 22 and 14. For example, the controller 26 may determine the estimated delay required to switch on at zero voltage based on at least one of the first and second voltage signals and the current signal together with the counted number of switching operations, and may adjust actuation instant in advance in consideration of the determined delay.

With the sensors equipped in the electric device 20, the electric device 20 may achieve various functionalities. In an embodiment, the electric device 20 may be used to determine capacitive condition based on the current signal in case that the reactive component 40 is the capacitor.

The capacitor, as a source of reactive power used for power factor correction, may age during its service life. For example, the capacitive condition of the capacitor may degrade as time elapses during operation. Since the capacitor may be directly coupled to the electric device 20, it is important to determine the condition of the capacitor to conduct a precaution for the capacitor, such that the capacitor may be replaced in advance before it meets break-down, or the capacitive reactive power has been deteriorated restricting the compensation ability of the capacitor bank.

The controller 26 may determine the capacitance of the capacitor in various manners. In an embodiment, the storage device 108 may store a rated current value for the initial capacitance of the capacitor. As the capacitance decreases, the current value may vary accordingly. As such, the controller 26 may determine the capacitive condition of the capacitor by comparing value indicated by the current signal with a rated current value. Alternatively, the controller 26 may determine the capacitive condition of the capacitor by comparing value indicated by the current signal with reference value(s) from current sensor(s) of further electric device(s), assuming that the further capacitor(s) connected to the further electric device(s) is in a good condition.

In another embodiment, the controller 26 may determine the capacitive condition of the capacitor by computing change of the current over time. Specifically, the controller 26 may determine an unacceptable condition or a failure of the capacitor, in case that the current deviation exceeds a predetermined threshold for a given period. In addition, the controller 26 may be further configured to determine a fault or a degree of a fault of the electric device in response to determining that a deviation of current in a time slot exceeds the predetermined threshold.

In a further embodiment, the controller 26 may determine the condition of the capacitor with the voltage signal from the second voltage sensor 34. Specifically, the controller 26 may cause the actuator 28 to switch off the switch 20. In response to opening the switch 20, the controller 26 may receive voltage signals indicating the residual voltages at the second contact 24 in a period. The controller 26 may determine the capacitance of the capacitor based on decay rate of the voltage at the second contact 24.

The controller 26 may be configured to determine harmonics of the system voltage sensed by the first voltage sensor 32. It is beneficial to determine harmonics of the voltage, since it may affect the lifetime of the capacitor. In addition, the controller 26 may be configured to determine harmonics of the current sensed by the current sensor 36. It is also beneficial to determine harmonics of the current, since it is associated with the abnormal condition of the capacitor. In other words, the controller 26 may be configured to determine the condition of the capacitor by determining the harmonics of the current. This approach may be combined with the manners for determining the condition of the capacitor described above.

Although a generic environment of a single phase implementing the embodiments of the disclosure is illustrated with reference to FIGS. 2 and 3, this is only for illustration without suggesting any limitations as to the scope of the subject matter described here. It is to be understood that the electric device 20 may be utilized in other multi-phase environments, such as single or two-phase and three-phase environments, as described below.

Figure 4A:
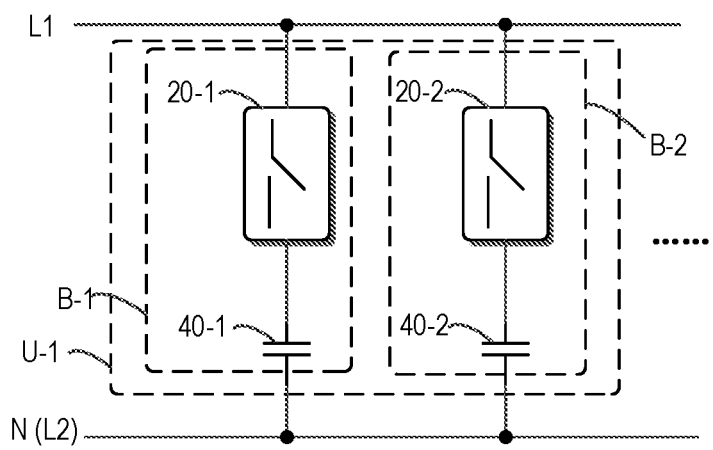
FIG. 4A is a block diagram illustrating a two-phase environment implementing an electric system in accordance with some example embodiments of the present disclosure.

FIG. 4A is a block diagram illustrating a single-phase or two-phase environment implementing an electric system in accordance with some example embodiments of the present disclosure. The single or two-phase electric system comprises a first supply line L1 of a first phase and a second line N(L2). In case of the single-phase environment, the second line N(L2) is a neutral line N. In case of the two-phase environment, the second line N(L2) is a second supply line L2 different from the first supply line L1. The single-phase or two-phase electric system further comprises a plurality of electric units. For brevity, only one electric unit U-1 is illustrated in FIG. 4A, and it can be understood that other electric unit(s) may have the same configuration.

The electric unit U-1 comprises a first branch B-1 and a second branch B-2. The first branch B-1 comprises a first electric device 20-1 coupled to the first supply line L1 and a first capacitor 40-1 coupled between the first electric device 20-1 and the second line N(L2). The second branch B-2 comprises a second electric device 20-2 coupled to the first supply line L1 and a second capacitor 40-2 coupled between the second electric device 20-2 and the second line N(L2). Although the first and second capacitors 40-1 and 40-2 are illustrated as individual capacitors, it can be understood that they may comprise a plurality of capacitive cells respectively.

The electric devices 20-1 and 20-2 may have a same internal configuration and may operate in a similar manner as the electric device 20 described with reference to FIGS. 2 and 3. Thus, the above features described with reference to FIGS. 2 and 3 may apply to both the electric device 20-1 and 20-2. In an embodiment, the electric unit U-1 may be manufactured as a single electric device. Alternatively, the electric unit U-1 may be constructed with two independent electric devices 20 and two independent capacitors 40-1 and 40-2. In another embodiment, the electric unit U-1 may only include the first electric devices 20-1 and 20-2 without capacitors 40-1 and 40-2. In this case, the electric unit U-1 has terminals for coupling to external capacitors.

Figure 4B:
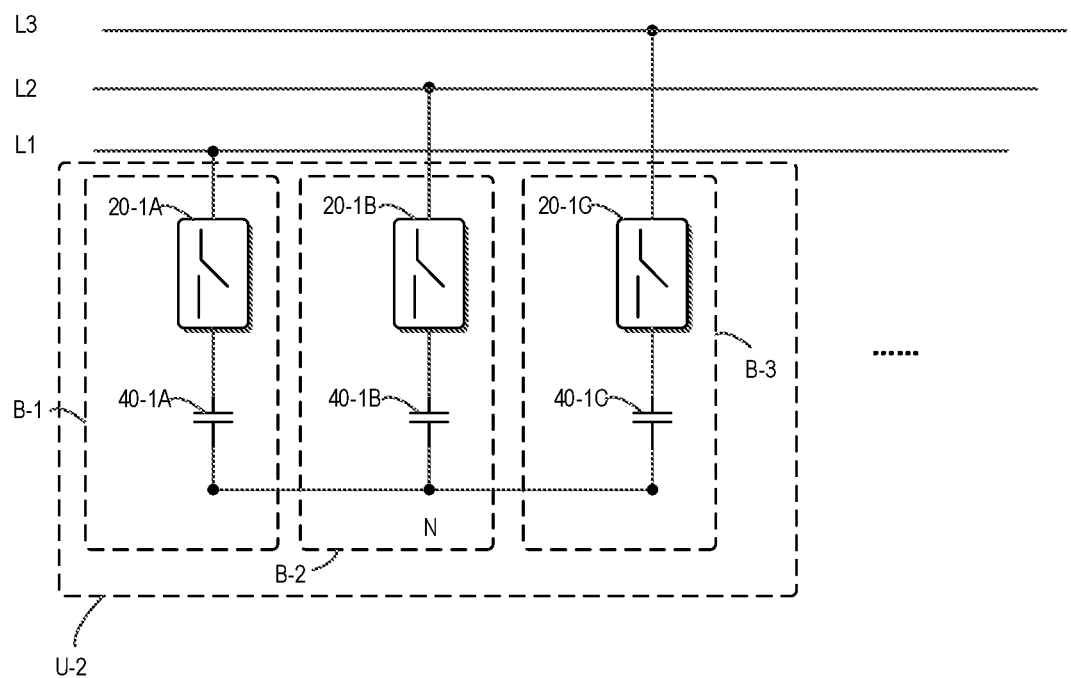
FIG. 4B is a block diagram illustrating a three-phase environment implementing an electric system in accordance with some example embodiments of the present disclosure.

FIG. 4B is a block diagram illustrating a three-phase environment implementing an electric system in accordance with some example embodiments of the present disclosure. The three-phase electric system comprises a first supply line L1 of a first phase, a second supply line L2 of a second phase and a third supply line L3 of a third phase. The three-phase electric system further comprises a plurality of electric units. For brevity, only one electric unit U-2 is illustrated in FIG. 4B, and it can be understood that other electric unit(s) may have the same configuration.

The electric unit U-2 comprises a first branch B-1 having an electric device 20-1A and a capacitor 40-1A, a second branch B-2 having an electric device 20-1B and a capacitor 40-1B and a third branch B-3 having an electric device 20-1C and a capacitor 40-1C. The three branches are configured in a star configuration in FIG. 4B. It could be understood that the electric unit B-2 may have other configurations.

In the embodiment, other electric unit(s) may be configured in a similar manner as the electric unit U-2 except for the neutral line(s). The neutral lines N and the neutral lines for other electric unit(s) may be at a same voltage or at different voltages. In an embodiment, the neutral lines of the electric units in FIG. 4B may be grounded or at other potential. It could be understood that the above features described with reference to FIGS. 2, 3 and 4A may apply to the environment of FIG. 4B.

Figure 4C:
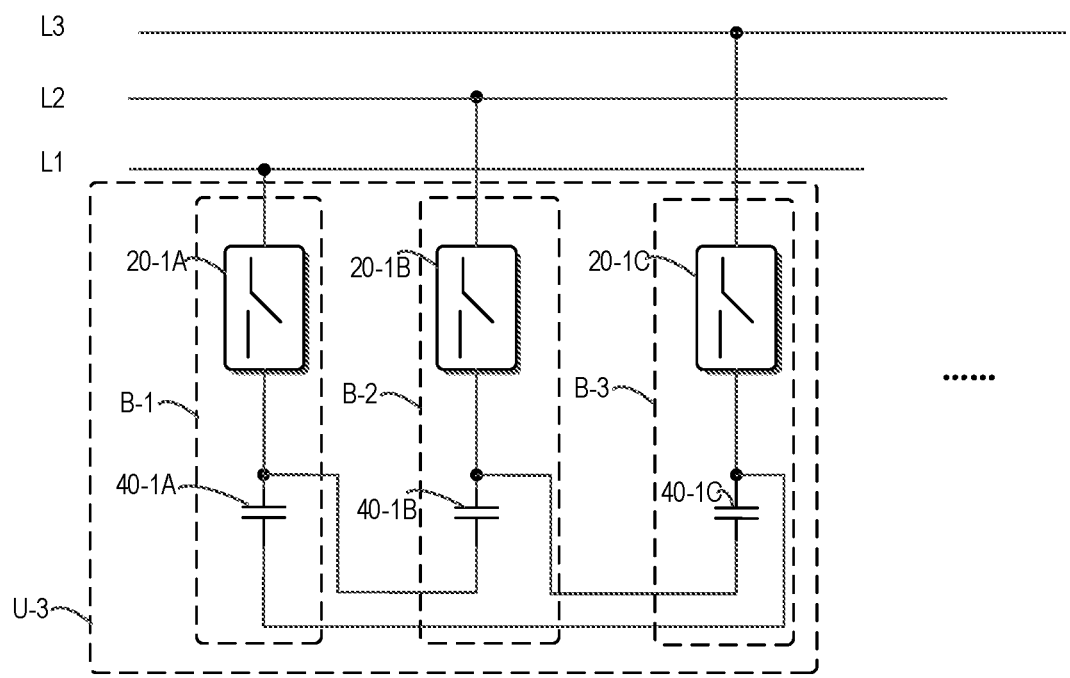
FIG. 4C is a block diagram illustrating another three-phase environment implementing another electric system in accordance with some example embodiments of the present disclosure.

FIG. 4C is a block diagram illustrating another three-phase environment implementing another electric system in accordance with some example embodiments of the present disclosure. The three-phase electric system comprises a first supply line L1 of a first phase, a second supply line L2 of a second phase and a third supply line L3 of a third phase. The three-phase electric system further comprises a plurality of electric units. For brevity, only one electric unit U-3 is illustrated in FIG. 4C, and it can be understood that other electric unit(s) may have the same configuration.

The electric unit U-3 comprises a first branch B-1 having an electric device 20-1A and a capacitor 40-1A, a second branch B-2 having an electric device 20-1B and a capacitor 40-1B and a third branch B-3 having an electric device 20-1C and a capacitor 40-1C. The three capacitors 40-1A, 40-1B and 40-1C are configured in a delta configuration in FIG. 4C. Specifically, the capacitor 40-1A is coupled between the electric devices 20-1A and 20-1C, the capacitor 40-1B is coupled between the electric devices 20-1A and 20-1B, and the capacitor 40-1C is coupled between the electric devices 20-1C and 20-1B.

In the embodiment, other electric unit(s) may be configured in a similar manner as the electric unit U-3. It could be understood that the above features described with reference to FIGS. 2, 3 and 4A may apply to the environment of FIG. 4C.

In the multi-phase electric systems, if capacitors of an electric unit are healthy, currents which flow through each electric devices are substantially the same. In the case, the electric power is distributed evenly in the electric unit, and the electric device is a balanced system. If for some reason the impedance of the capacitor changes, this will introduce the unbalance, resulting in current distribution change. The current distribution change can be sensed.

In case that the electric power is unevenly distributed for the multi-phases, such as the electric systems of FIGS. 4A, 4B and 4C, due to degradation of the capacitor, the current sensors of the electric units sense the current distribution change. For each electric unit in FIGS. 4A, 4B and 4C, it may comprise a main controller (not shown) coupled to the sensors of the electric devices or to controllers of the electric devices to receive signals from the sensors.

The main controller may be configured to determine unbalance of the multi-phases based on voltage signals and current signals from each of the electric devices. Alternatively, one of the controllers of the branches may act as the main controller to determine unbalance of the multi-phases based on voltage signals and current signals from each of the electric devices. As such, cost for the electric system may be reduced since the main controller can be omitted in the electric system.

In response to the determined unbalance for the three phases of a branch, the main controller may transmit an alert signal to the external controller or the remote controlling center to indicate that one of the capacitors of the electric units is degraded and may need to be replaced. Alternatively, one of the controllers of the multi-phases acting as the main controller may transmit the alert signal to the external controller or the remote controlling center.

As detailed specified above, by storing algorithms in the storage device and utilizing signals of at least one of the current sensor 36, the first and second voltage sensors 32 and 34, and the temperature sensor 38, the controller 26 may achieve various functionalities, such as capacitor diagnose, PoW switching, failure detection, state detection, load distribution and so on, without significantly increasing cost, because the sensors and controllers can be implemented with low cost. In addition, the electric device 20 is capable of "self-learning" to update itself based on changing conditions, such as mechanical wear, abnormal operation time and so on.

Figure 5:
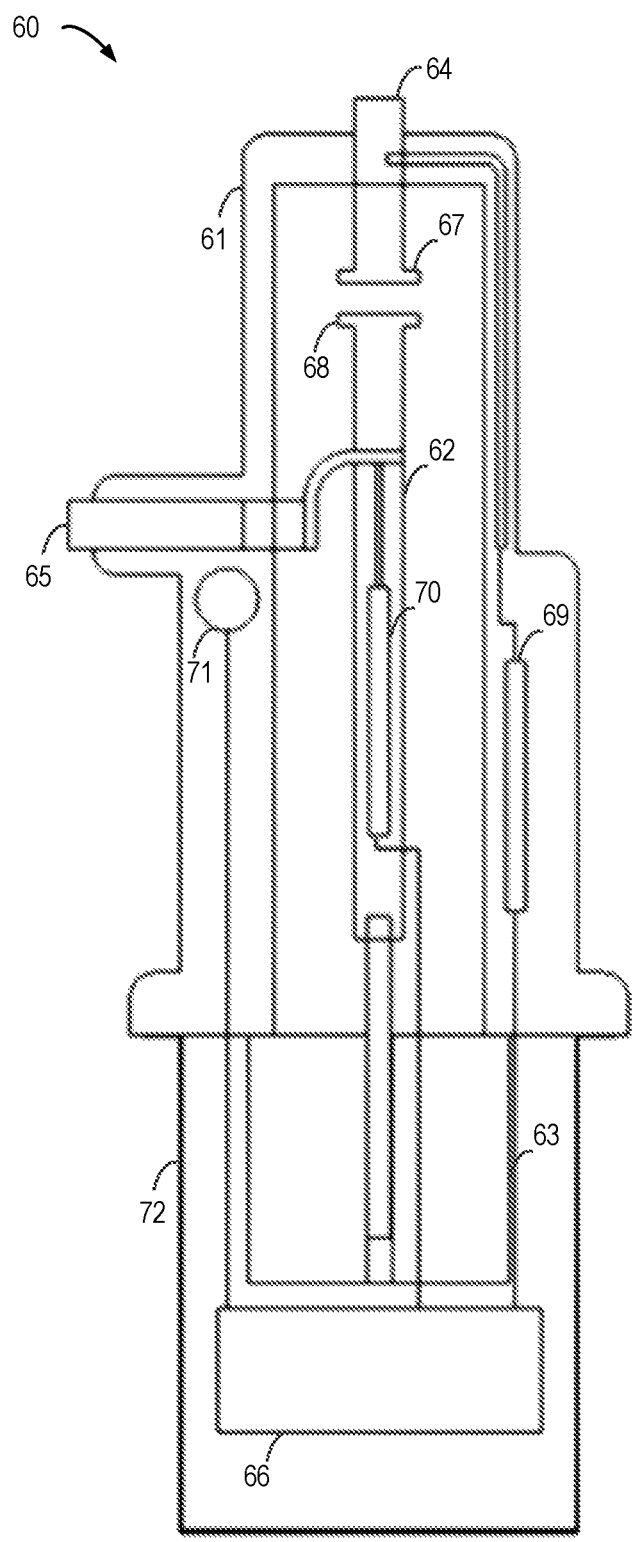
FIG. 5 illustrates a cross-section view of an electric device in accordance with some example embodiments of the present disclosure.

FIG. 5 illustrates a cross-section view of a switch 60 in accordance with some example embodiments of the present disclosure. The switch 60 may be an example of the switch 20 in an embodiment. Thus, the features described with reference to FIG. 3 and FIGS. 4A-4C may apply to FIG. 5.

The switch 60 comprises a switch body 61 and an actuator housing 72 fixed to the switch body 61. The actuator housing 72 contains an actuator 63 and a circuit board (or plurality of circuit boards) 66 comprising the controller 26. The switch body 61 is an insulator, and contains a drive rod 62, an input terminal 64, a first contact 67, a second contact 68, a first voltage sensor 69, a second voltage sensor 70, and a current sensor 71. The drive rod 62 is coupled to the second contact 68 and the coil of the actuator 63, such that the actuator 63 may drive the second contact 68 via the rod 62.

The first voltage sensor 69 may be a first voltage divider comprising a first resistor and a second resistor coupled in series. The first resistor may be located inside the switch body 61 and the second resistor may be located on the circuit board 66 carrying the controller 26 inside the actuator housing 72. The second voltage sensor 70 may be a second voltage divider comprising a third resistor and a fourth resistor coupled in series. The third resistor may be integrated into a drive rod 62 of the device, and the fourth resistor may be located on the circuit board 66 carrying the controller 26 inside the actuator housing 72. Alternatively, the third resistor may be located adjacent to and in parallel to the drive rod 62 inside the switch body 61.

By setting the first and third resistors vertically in parallel to the rod at a center position and an outer position respectively, and by setting the second and fourth resistors inside the actuator housing 72 in a similar manner, the switch 60 can be reduced to a compact size.

The current sensor 71 may be implemented as a Rogowski coil in the insulator of the switch. The coil is located adjacent to an output terminal 65 of the switch 60 coupling to the reactive component, to obtain an accurate sensing result. With an implementation of a Rogowski coil at the output terminal 65, the size of the switch 60 may be further reduced.

Figure 6:
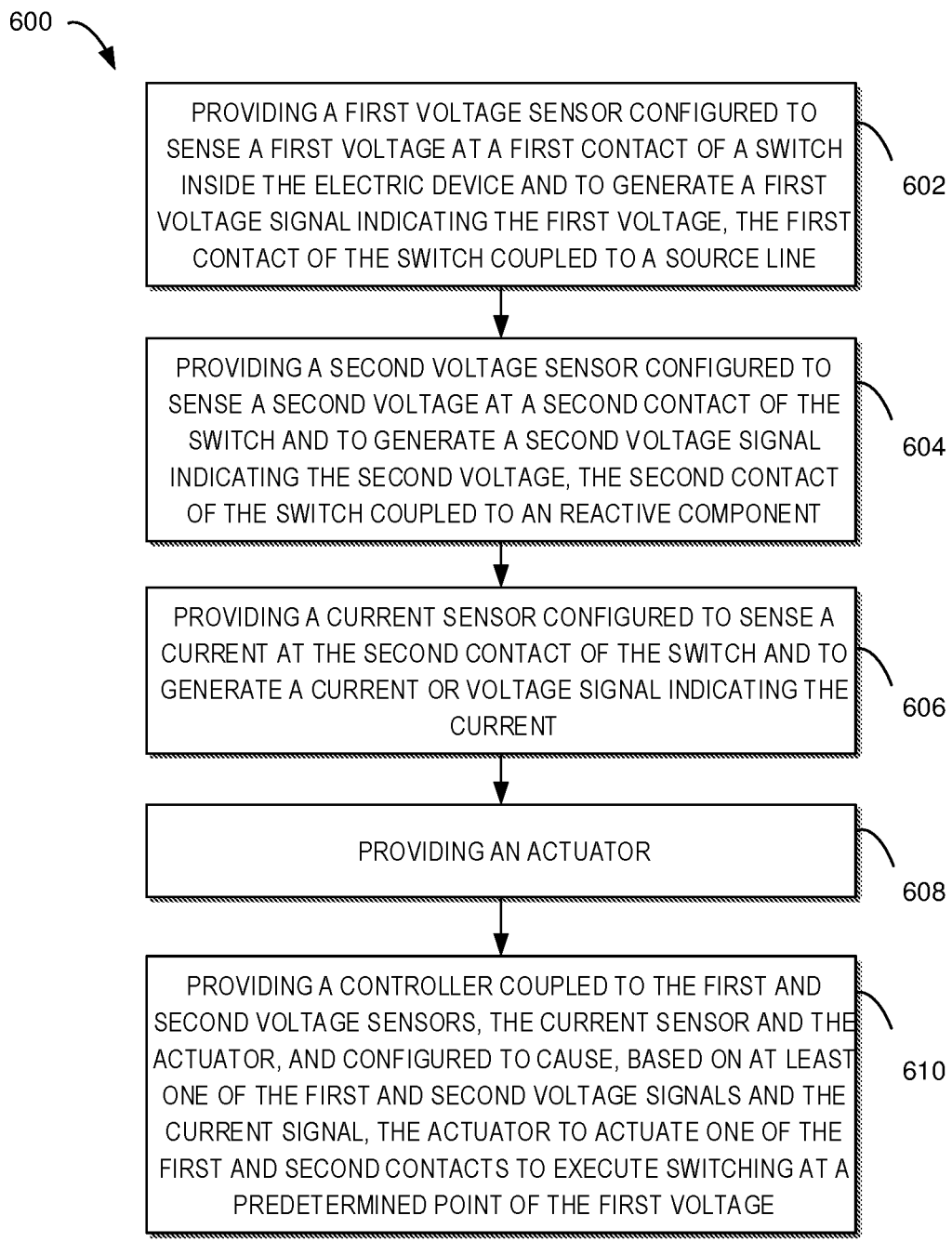
FIG. 6 illustrates a flowchart of a method for manufacturing an electric device in accordance with some example embodiments of the present disclosure.

FIG. 6 illustrates a flowchart of a method 600 for manufacturing an electric device in accordance with some example embodiments of the present disclosure. The electric device of FIG. 6 may be the electric device 200 or the electric device 60 in an embodiment. Thus, the features described with reference to FIGS. 3-5 may apply to the method 600 of FIG. 6.

At 602, it is provided a first voltage sensor configured to sense a first voltage at a first contact of a switch inside the electric device and to generate a first voltage signal indicating the first voltage. The first contact of the switch is coupled to a source line. At 604, it is provided a second voltage sensor configured to sense a second voltage at a second contact of the switch and to generate a second voltage signal indicating the second voltage. The second contact of the switch is coupled to a reactive component.

At 606, it is provided a current sensor configured to sense a current at the second contact of the switch and to generate a current or voltage output signal indicating the current. At 608, it is provided an actuator. At 610, it is provided a controller coupled to the first and second voltage sensors, the current sensor and the actuator. The controller is configured to cause, based on at least one of the first and second voltage signals and the current signal, the actuator to actuate one of the first and second contacts to execute switching at a predetermined point of the first voltage.

Hereinafter, some example implementations of the subject matter described herein will be listed.

Item 1. It is provided an electric device. The electric device comprises a first voltage sensor configured to sense a first voltage at a first contact of a switch inside the electric device and to generate a first voltage signal indicating the first voltage, the first contact of the switch coupled to a source line; a second voltage sensor configured to sense a second voltage at a second contact of the switch and to generate a second voltage signal indicating the second voltage, the second contact of the switch coupled to a reactive component; a current sensor configured to sense a current at the second contact of the switch and to generate a current or voltage output signal indicating the current; an actuator; and a controller coupled to the first and second voltage sensors, the current sensor and the actuator, and configured to cause, based on at least one of the first and second voltage signals and the current signal, the actuator to actuate one of the first and second contacts to execute switching at a predetermined point of the first voltage.

Item 2. The electric device of Item 1, wherein the controller is further configured to determine a switching status of the switch based on the first and second voltage signals or the current signal.

Item 3. The electric device of Item 1 or 2, wherein the controller is further configured to determine an open status of the switch in response to the first voltage being different from the second voltage or the current being zero; and determine a closed status of the switch in response to the first voltage being equaling to the second voltage or the current being different from zero.

Item 4. The electric device any of Items 1-3, wherein the reactive component comprises a capacitor, wherein the controller is further configured to determine a capacitive condition of the capacitor based on the current signal.

Item 5. The electric device any of Items 1-4, wherein the controller is further configured to determine the capacitive condition of the capacitor by comparing value indicated by the current signal with a rated current value or a reference value from a current sensor of a further electric device.

Item 6. The electric device any of Items 1-5, wherein the controller is further configured to determine the capacitive condition of the capacitor by computing change of the current over time.

Item 7. The electric device any of Items 1-6, wherein the controller is further configured to determine a fault or a degree of a fault of the electric device in response to determining that a deviation of current in a time slot exceeds a predetermined threshold.

Item 8. The electric device any of Items 1-7, further comprising a temperature sensor configured to sense temperature of the actuator and to generate a temperature signal indicating the temperature; wherein the controller is further configured to cause, based on the temperature signal and the at least one of the first and second voltage signals and the current signal, the actuator to actuate one of the first and second contacts.

Item 9. The electric device any of Items 1-8, wherein the controller is further configured to cause the actuator to adjust actuation instant of the one of the first and second contacts based on the temperature signal.

Item 10. The electric device any of Items 1-9, further comprising a counter configured to count number of switching operation of the switch, wherein the controller is further configured to adjust, based on the counted number and the at least one of the first and second voltage signals and the current signal, actuation instant of the one of the first and second contacts.

Item 11. The electric device any of Items 1-10, wherein the controller is further configured to calibrate operation of the actuator based on the first and second voltage signals and the current signal.

Item 12. The electric device any of Items 1-11, wherein the controller is further configured to transmitting a switching-on signal to the actuator at a first temporal point; determine, based on at least one of the first and second voltage signals and the current signal, a second temporal point of the switch being switched on; compute delay between the first temporal point and the second temporal point; and calibrate the operation of the actuator based on the computed delay.

Item 13. The electric device any of Items 1-12, wherein the first voltage sensor comprises a first voltage divider comprising a first resistor and a second resistor coupled in series; and the second voltage sensor comprises a second voltage divider comprising a third resistor and a fourth resistor coupled in series.

Item 14. The electric device any of Items 1-13, wherein the first resistor is mounted inside body of the switch; the third resistor is integrated into a drive rod of the electric device; and the second and fourth resistors are located on a board carrying the controller.

Item 15. The electric device any of Items 1-14, wherein the current sensor comprises a coil in an insulator of the switch, the coil is located adjacent to an output terminal of the switch coupling to the reactive component.

Item 16. It is provided an electric system. The electric system comprises a plurality of branches each comprising a reactive component and an electric device of any of Items 1-15 coupled to the reactive component.

Item 17. The electric system of Item 16, wherein one of the plurality of branches comprise a first phase unit comprising a first reactive component and a first electric device of any of Items 1-15 coupled to the first reactive component; a second phase unit for a second phase comprising a second reactive component and a second electric device of any of Items 1-15 coupled to the second reactive component; and a third phase unit comprising a third reactive component and a third electric device of any of Items 1-15 coupled to the third reactive component.

Item 18. The electric system of Item 16 or 17, further comprising a main controller coupled to the first, second and third electric devices and configured to determine unbalance of the first, second and third phase units based on voltage signals and current signals from each of the first, second and third electric devices.

Item 19. The electric system of any of Items 16-18, wherein a controller of one of the first, second and third electric devices is configured to determine unbalance of the first, second and third phase units based on voltage signals and current signals from each of the first, second and third electric devices.

Item 20. It is provided method for manufacturing an electric device. The method comprises providing a first voltage sensor configured to sense a first voltage at a first contact of a switch inside the electric device and to generate a first voltage signal indicating the first voltage, the first contact of the switch coupled to a source line; providing a second voltage sensor configured to sense a second voltage at a second contact of the switch and to generate a second voltage signal indicating the second voltage, the second contact of the switch coupled to a reactive component; providing a current sensor configured to sense a current at the second contact of the switch and to generate a current or voltage output signal indicating the current; providing an actuator; and providing a controller coupled to the first and second voltage sensors, the current sensor and the actuator, and configured to cause, based on at least one of the first and second voltage signals and the current signal, the actuator to actuate one of the first and second contacts to execute switching at a predetermined point of the first voltage.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electric device comprising:
    a first voltage sensor configured to sense a first voltage at a first contact of a switch inside the electric device and to generate a first voltage signal indicating the first voltage, the first contact of the switch coupled to a source line;
    a second voltage sensor configured to sense a second voltage at a second contact of the switch and to generate a second voltage signal indicating the second voltage, the second contact of the switch coupled to a reactive component;

a current sensor configured to sense a current at the second contact of the switch and to generate a current signal comprising a current output signal or a voltage output signal indicating the current;

an actuator; and a controller coupled to the first voltage sensor and the second voltage sensor, the current sensor and the actuator, and configured to cause, based on at least one of the first voltage signal and the second voltage signal and the current signal, the actuator to actuate one of the first contact and the second contact to execute switching at a predetermined point of the first voltage, wherein the reactive component comprises a capacitor, wherein the controller is further configured to determine a capacitive condition of the capacitor based on the current signal sensed at the second contact.

2. The electric device of claim 1, wherein the controller is further configured to determine a switching status of the switch based on the first voltage signal and the second voltage signal or the current signal.

3. The electric device of claim 2, wherein the controller is further configured to determine an open status of the switch in response to the first voltage being different from the second voltage or the current being zero; and determine a closed status of the switch in response to the first voltage being equal to the second voltage or the current being different from zero.

4. The electric device of claim 1, wherein the controller is further configured to determine the capacitive condition of the capacitor by comparing a value indicated by the current signal sensed with a rated current value or a reference value from a current sensor of a further electric device.

5. The electric device of claim 1, wherein the controller is further configured to determine the capacitive condition of the capacitor by computing a change of the current over time.

6. The electric device of claim 1, wherein the controller is further configured to determine a fault or a degree of a fault of the electric device in response to determining that a deviation of current in a time slot exceeds a predetermined threshold.

7. The electric device of claim 1, further comprising a temperature sensor configured to sense a temperature of the actuator and to generate a temperature signal indicating the temperature;

wherein the controller is further configured to cause, based on the temperature signal and at least one of the first voltage signal and the second voltage signal and the current signal, the actuator to actuate one of the first and second contacts.

8. The electric device of claim 1, wherein the controller is further configured to adjust actuation instant of the one of the first contact and the second contact based on a temperature signal.

9. The electric device of claim 1, further comprising a counter configured to count a number of switching operations of the switch, wherein the controller is further configured to adjust, based on the number of switching operations counted and at least one of the first voltage signal and the second voltage signal and the current signal, an actuation instant of the one of the first contact and the second contact.

10. The electric device of claim 1, wherein the controller is further configured to calibrate operation of the electric device based on the first voltage signal and the second voltage signal and the current signal.

11. The electric device of claim 10, wherein the controller is further configured to:

transmit a switching-on signal to the actuator at a first temporal point;

determine, based on at least one of the first voltage signal and the second voltage signal and the current signal, a second temporal point of the switch being switched on;

compute delay between the first temporal point and the second temporal point; and calibrate operation of the actuator based on the delay computed.

12. The electric device of claim 1, wherein the first voltage sensor comprises a first voltage divider comprising a first resistor and a second resistor coupled in series; and the second voltage sensor comprises a second voltage divider comprising a third resistor and a fourth resistor coupled in series.

13. The electric device of claim 12, wherein the first resistor is mounted inside a body of the switch;

the third resistor is integrated into a drive rod of the electric device; and the second resistor and the fourth resistor are located on a board or boards containing the controller.

14. The electric device of claim 1, wherein the current sensor comprises a coil in an insulator of the switch, the coil being located adjacent to an output terminal of the switch coupling to the reactive component.

15. An electric system comprising:

a plurality of branches each comprising the reactive component and the electric device of claim 1 coupled to the reactive component.

16. The electric system of claim 15, wherein one of the plurality of branches comprise:

a first phase unit comprising a first reactive component and a first electric device of claim 1 coupled to the first reactive component;

a second phase unit comprising a second reactive component and a second electric device of claim 1 coupled to the second reactive component; and a third phase unit comprising a third reactive component and a third electric device of claim 1 coupled to the third reactive component.

17. The electric system of claim 16, further comprising a main controller coupled to the first electric device, the second electric device and the third electric device and configured to determine unbalance of the first phase unit, the second phase unit and the third phase unit based on voltage signals and current signals from each of the first electric device, the second electric device and the third electric device.

18. The electric system of claim 16, wherein a controller of one of the first electric device, the second electric device and the third electric device is configured to determine unbalance of the first phase unit, the second phase unit and the third phase unit based on voltage signals and current signals from each of the first electric device, the second electric device and the third electric device.

19. A method for manufacturing an electric device, the method comprising:

providing a first voltage sensor configured to sense a first voltage at a first contact of a switch inside the electric device and to generate a first voltage signal indicating the first voltage, the first contact of the switch coupled to a source line;

providing a second voltage sensor configured to sense a second voltage at a second contact of the switch and to generate a second voltage signal indicating the second voltage, the second contact of the switch coupled to a reactive component;

providing a current sensor configured to sense a current at the second contact of the switch and to generate current signal comprising a current or voltage output signal indicating the current;

providing an actuator; and providing a controller coupled to the first voltage sensor and the second voltage sensor, the current sensor and the actuator, and configured to cause, based on at least one of the first voltage signal and the second voltage signal and the current signal, the actuator to actuate one of the first contact and the second contact to execute switching at a predetermined point of the first voltage, wherein the reactive component comprises a capacitor, wherein the controller is further configured to determine a capacitive condition of the capacitor based on the current signal sensed at the second contact.

* * * * *